(12) United States Patent
Medina et al.

(10) Patent No.: US 8,252,223 B2
(45) Date of Patent: Aug. 28, 2012

(54) METHODS AND SYSTEMS FOR INTEGRATING FLUID DISPENSING TECHNOLOGY WITH STEREOLITHOGRAPHY

(75) Inventors: Francisco Medina, El Paso, TX (US);
Ryan Wicker, El Paso, TX (US);
Jeremy A. Palmer, Albuquerque, NM (US); Don W. Davis, Albuquerque, NM (US); Bart D. Chavez, Albuquerque, NM (US); Phillip L. Gallegos, Albuquerque, NM (US)

(73) Assignees: Board of Regents, The University of Texas System, Austin, TX (US); Sandia Corporation, Operator of Sandia National Laboratories, Albuquerque, NM (US)

( * ) Notice: Subject to any disclaimer, the term of this patent is extended or adjusted under 35 U.S.C. 154(b) by 97 days.

(21) Appl. No.: 12/646,632

(22) Filed: Dec. 23, 2009

(65) Prior Publication Data
US 2010/0127433 A1    May 27, 2010

Related U.S. Application Data

(62) Division of application No. 11/095,120, filed on Mar. 31, 2005, now Pat. No. 7,658,603.

(51) Int. Cl.
*B29C 35/08* (2006.01)
(52) U.S. Cl. ..... 264/401; 264/308; 264/497; 425/174.4; 425/375
(58) Field of Classification Search .............. 264/401, 264/308, 497; 425/174.4, 375
See application file for complete search history.

(56) References Cited

U.S. PATENT DOCUMENTS
4,575,330 A    3/1986    Hull ........................ 425/174.4
(Continued)

FOREIGN PATENT DOCUMENTS
DE        29907262        8/1999
(Continued)

OTHER PUBLICATIONS

Baldwin et al., "Materials for protein delivery in tissue engineering," *Advanced Drug Delivery Reviews*, 33:71-86, 1998.

(Continued)

*Primary Examiner* — Joseph Del Sole
*Assistant Examiner* — Nahida Sultana
(74) *Attorney, Agent, or Firm* — Fulbright & Jaworski L.L.P.

(57) ABSTRACT

An integrated system and method of integrating fluid dispensing technologies (e.g., direct-write (DW)) with rapid prototyping (RP) technologies (e.g., stereolithography (SL)) without part registration comprising: an SL apparatus and a fluid dispensing apparatus further comprising a translation mechanism adapted to translate the fluid dispensing apparatus along the Z-, Y- and Z-axes. The fluid dispensing apparatus comprises: a pressurized fluid container; a valve mechanism adapted to control the flow of fluid from the pressurized fluid container; and a dispensing nozzle adapted to deposit the fluid in a desired location. To aid in calibration, the integrated system includes a laser sensor and a mechanical switch. The method further comprises building a second part layer on top of the fluid deposits and optionally accommodating multi-layered circuitry by incorporating a connector trace. Thus, the present invention is capable of efficiently building single and multi-material SL fabricated parts embedded with complex three-dimensional circuitry using DW.

13 Claims, 6 Drawing Sheets

U.S. PATENT DOCUMENTS

| | | | |
|---|---|---|---|
| 4,942,001 A | 7/1990 | Murphy et al. | 264/22 |
| 5,088,047 A | 2/1992 | Bynum | 700/182 |
| 5,143,663 A | 9/1992 | Leyden et al. | 264/22 |
| 5,398,193 A | 3/1995 | deAngelis | 700/119 |
| 5,402,351 A | 3/1995 | Batchelder et al. | 700/119 |
| 5,474,719 A * | 12/1995 | Fan et al. | 264/401 |
| 5,510,066 A | 4/1996 | Fink et al. | 264/40.1 |
| 5,658,412 A | 8/1997 | Retallick et al. | 156/272 |
| 5,779,967 A | 7/1998 | Hull | 264/401 |
| 5,786,023 A | 7/1998 | Maxwell et al. | 427/8 |
| 5,869,170 A | 2/1999 | Cima et al. | 428/304.4 |
| 5,876,550 A | 3/1999 | Feygin et al. | 156/264 |
| 5,902,538 A | 5/1999 | Kruger et al. | 264/401 |
| 5,980,813 A | 11/1999 | Narang et al. | 264/401 |
| 6,027,699 A | 2/2000 | Holcomb et al. | 422/186.04 |
| 6,153,034 A | 11/2000 | Lipsker | 156/73.1 |
| 6,158,346 A | 12/2000 | Zhang | 101/489 |
| 6,159,411 A | 12/2000 | Kulkarni et al. | 264/401 |
| 6,179,601 B1 | 1/2001 | Kruger et al. | 425/174.4 |
| 6,206,672 B1 | 3/2001 | Grenda | 425/174.4 |
| 6,216,765 B1 | 4/2001 | Tseng et al. | 164/271 |
| 6,242,163 B1 | 6/2001 | Stampfl et al. | 430/322 |
| 6,309,581 B1 | 10/2001 | Gervasi | 264/401 |
| 6,372,178 B1 | 4/2002 | Tseng | 264/656 |
| 6,391,251 B1 | 5/2002 | Keicher et al. | 419/7 |
| 6,450,393 B1 | 9/2002 | Doumanidis et al. | 228/110.1 |
| 6,492,651 B2 | 12/2002 | Kerekes | 419/559.2 |
| 6,549,710 B2 | 4/2003 | Simmons et al. | 385/121 |
| 6,554,600 B1 * | 4/2003 | Hofmann et al. | 425/174.4 |
| 6,623,687 B1 | 9/2003 | Gervasi et al. | 264/401 |
| 6,630,093 B1 | 10/2003 | Jones | 264/401 |
| 6,641,897 B2 | 11/2003 | Gervasi | 428/172 |
| 6,656,410 B2 * | 12/2003 | Hull et al. | 264/401 |
| 6,706,234 B2 | 3/2004 | Huang | 264/435 |
| 6,711,451 B2 | 3/2004 | Hastert et al. | 700/119 |
| 6,733,267 B2 * | 5/2004 | Chapman et al. | 425/174.4 |
| 6,752,948 B2 | 6/2004 | Newell et al. | 264/234 |
| 6,753,358 B2 | 6/2004 | Fisher et al. | 522/18 |
| 6,847,774 B2 | 1/2005 | Simmons et al. | 385/134 |
| 6,849,223 B2 | 2/2005 | Dean et al. | 264/400 |
| 6,998,017 B2 | 2/2006 | Lindsay et al. | 162/109 |
| 7,229,144 B2 | 6/2007 | Nielsen et al. | 347/2 |
| 7,332,537 B2 * | 2/2008 | Bredt et al. | 524/423 |
| 7,384,255 B2 * | 6/2008 | LaBossiere et al. | 425/190 |
| 7,419,630 B2 | 9/2008 | Palmer et al. | 264/401 |
| 7,495,034 B2 | 2/2009 | Litke et al. | 522/96 |
| 7,614,866 B2 * | 11/2009 | Sperry et al. | 425/174.4 |
| 7,754,807 B2 * | 7/2010 | Priedeman et al. | 524/556 |
| 2001/0026793 A1 | 10/2001 | Jamiolkowski et al. | 424/78.17 |
| 2002/0104973 A1 | 8/2002 | Kerekes | 250/559.2 |
| 2002/0123134 A1 | 9/2002 | Huang et al. | 435/287.2 |
| 2002/0171178 A1 | 11/2002 | Dean et al. | 264/401 |
| 2003/0031449 A1 | 2/2003 | Simmons et al. | 385/134 |
| 2003/0031452 A1 | 2/2003 | Simmons et al. | 385/147 |
| 2003/0032214 A1 | 2/2003 | Huang | 264/435 |
| 2003/0032733 A1 | 2/2003 | Fisher et al. | 525/329.6 |
| 2003/0173695 A1 | 9/2003 | Monkhouse et al. | 264/40.1 |
| 2004/0006438 A1 | 1/2004 | Hastert et al. | 702/60 |
| 2004/0046287 A1 | 3/2004 | Andino et al. | 264/401 |
| 2004/0120981 A1 | 6/2004 | Nathan | 424/426 |
| 2005/0169962 A1 | 8/2005 | Bhatia et al. | 435/173.1 |
| 2005/0263932 A1 | 12/2005 | Heugel | 264/497 |
| 2006/0022379 A1 | 2/2006 | Wicker et al. | 425/174.4 |
| 2006/0225834 A1 | 10/2006 | Medina et al. | 425/174.4 |
| 2006/0237880 A1 | 10/2006 | Wicker et al. | 264/401 |

FOREIGN PATENT DOCUMENTS

| | | |
|---|---|---|
| EP | 1 245 369 | 2/2002 |
| JP | U-2-080430 | 3/1990 |
| JP | A-6-315986 | 11/1994 |
| JP | A-9-50299 | 3/1997 |
| JP | A-2003-507499 | 2/2003 |
| WO | WO 02/085246 | 10/2002 |
| WO | WO 03/002490 | 1/2003 |
| WO | WO 2004/006840 | 1/2004 |
| WO | WO 2005/035726 | 4/2005 |

OTHER PUBLICATIONS

Cooke et al., "Use of stereolithography to manufacture critical-sized 3D biodegradable scaffolds for bone ingrowth," Wiley Periodicals Inc., 2001.

De Laurentis et al., "Procedure for rapid fabrication of non-assembly mechanisms with embedded components," DETC 2002/MECH-34350, pp. 1-7, 2000.

De Laurentis et al., "Rapid fabrication of non-assembly robotic systems with embedded components," Robotics and Mechatronics Laboratory, Rutgers University, pp. 1-30.

Dhariwalia et al., "Rapid prototyping of tissue-engineering constructs, using photopolymerizable hydrogels and stereolithography," *Tissue Engineering*, 10(9-10):1316-1322, 2004.

Drury et al., "Hydrogels for tissue engineering: scaffold design variables and applications," *Science Direct, Biomaterials*, pp. 1-15, 2003.

Geving et al., "Conceptual design of a generalized stereolithography machine," The George W. Woodruff School of Mechanical Engineering, pp. 1-9, 2000.

Hadlock et al., "A polymer foam conduit seeded with Schwann cells promotes guided peripheral nerve regeneration," *Tissue Engineering*, 6(2):119-127, 2000.

Hatanaka et al., "Process planning for embedding flexible materials in multi-material protypes," DECTC2003/DFM048166, pp. 1-9, 2003.

Heath and Rutkowski, "The development of bioartificial nerve grafts for peripheral-nerve regeneration," *Tibtech*, 16:163-168, 1998.

Hoffman, "Hydrogels for biomedical applications," *Advanced Drug Delivery Reviews*, 43:3-12, 2002.

Kataria et al., "Building around inserts: methids for fabricating complex devices in stereolithography," DETC00/MECH-14206, pp. 1-11, 2000.

Lee et al., "Cure depth in photopolymerization: experiments and theory," *J. Mater. Res.*, 16:3536-3544, 2001.

Liu et al., "Three dimensional photopatterning of hydrogels containing living cells," *Biomedical Devices*, 4:257-66, 2002.

Maruo et al., "Multi-polymer microstereolithography for hybrid opto-mems," Department of Micro System Engineering, Nagoya University, IEEE, pp. 151-154, 2001.

Office Action issued in U.S. Appl. No. 10/903,379, mailed Mar. 27, 2008.

Office Action issued in U.S. Appl. No. 10/903,379, mailed Oct. 1, 2008.

Office Action issued in U.S. Appl. No. 10/907,984, mailed Sep. 3, 2008.

Office Action issued in U.S. Appl. No. 11/095,120, mailed Aug. 1, 2008.

Office Action issued in U.S. Appl. No. 11/095,120, mailed Nov. 5, 2008.

Office Action issued in U.S. Appl. No. 11/095,120, mailed Jun. 22, 2009.

Office Action issued in U.S. Appl. No. 10/907,984, mailed Jun. 3, 2009.

Office Action issued in U.S. Appl. No. 10/907,984, mailed Feb. 5, 2010.

Sundback et al., "Manufacture of porous polymer nerve conduits by a novel low-pressure injection molding process," *Biomaterials*, 24:819-830, 2003.

U.S. Appl. No. 12/181,486 entitled "Methods and Systems for Rapid Prototyping of High Density Circuits," by Jeremy A. Palmer et al., filed Jul. 29, 2008.

Office Communication issued in Japanese Patent Application No. 2008-538861, dated May 16, 2011. (English Translation enclosed).

Office Communication issued in U.S. Appl. No. 12/862,546, dated Jun. 7, 2011.

Office Communication issued in U.S. Appl. No. 12/389,147, dated Aug. 17, 2010.

PCT International Search Report issued in International application No. PCT/US06/15237, dated Aug. 31, 2007.

PCT Written Opinion issued in International application No. PCT/US06/15237, dated Aug. 31, 2007.

\* cited by examiner

METHODS AND SYSTEMS FOR INTEGRATING FLUID DISPENSING TECHNOLOGY WITH STEREOLITHOGRAPHY

This application is a divisional of, and claims priority to, co-pending U.S. patent application Ser. No. 11/095,120, filed Mar. 21, 2005.

BACKGROUND

The present invention relates to the general field of rapid prototyping (RP) technology, and in particular, to stereolithography (SL) and fluid dispensing technologies, such as direct-write (DW) technologies.

RP technologies, also known as Solid Freeform Fabrication (SFF), layered manufacturing and other similar technologies enable the manufacture of complex three-dimensional (3D) parts. RP technologies, in particular, generally construct parts by building one layer at a time for use in, for example, the toy, automotive, aircraft and medical industries. Oftentimes prototypes made by RP technologies aid in research and development and provide a low cost alternative to traditional prototyping.

SL is one of the most widely used RP technologies known in the art. The resolution of SL machines and the ability of SL to manufacture highly complex 3D objects, make SL ideal for building both functional and non-functional prototypes. In particular, SL techniques provide economical, physical models of objects quickly prior to making more expensive finished parts. The models are readily customizable and design changes may be easily implemented.

SL generally involves a multi-stage process. For example, the first stage involves designing and inputting a precise mathematical and geometric description of the desired structure's shape into one of many computer-aided design (CAD) programs and saving the description in the standard transform language (STL) file format. In the second stage, the STL file is imported into SL machine-specific software (RP software). The RP software slices the design into layers and determines the placement of support structures to hold each cross-section in place while building the structure layer by layer. By computing build parameters, the RP software controls the part's fabrication. In the layer preparation stage, the build parameters for the desired part are translated into machine language. Finally, the machine language controls the SL machine to build a desired part and its support structures layer by layer. SL machines typically focus an ultraviolet (UV) laser onto a cross-section of a liquid photopolymer resin. The laser, in turn, selectively cures a resin to form a structure, layer by layer. Ultimately, the part is cleaned, the support structure is removed and the part is post-cured (typically exposed to UV) prior to completion.

SL technologies known in the art generally include, for example, a laser, a liquid level sensing system, laser beam optics and controllable scanning mirror system, a vertically movable platform, a resin retaining receptacle or vat and a recoating device. During the laser scanning phase, a series of optics and controllable scanning mirrors raster a UV laser beam to solidify a photopolymer resin. The subject 3D part is first attached to the platform by building a support structure with the platform in its topmost position. This step allows for misalignment between the platform and the surface of the liquid resin—once constructed, the base support structure is parallel with the surface of the liquid. When building the subject part simultaneously with its required support structure and after the laser beam completes a layer, the platform typically is vertically traversed downward a distance equal to the build layer thickness. After the platform is vertically traversed downward and prior to selectively curing the next layer, a recoating device is typically traversed horizontally across the part that deposits a uniform layer of liquid polymer across the part. The recoating device ensures that trapped spaces within the part are filled with liquid resin (which may be required for future build layers), and is used to maintain a constant build layer thickness. The process repeats as each layer is built. Complex-shaped parts are thus manufactured by repeating the layering process. Once complete, the part is typically raised out of the liquid polymer, the support structure is removed from the part and the part is cleaned and then post-cured. The operator may, however, need to sand, file or use some other finishing technique on the part in order to provide a specific surface finish to the structure, which may include painting, plating and/or coating the surface.

Although SL technologies for complex functional parts and prototypes have greatly improved in recent years, there is still a need to improve SL technologies for building functional electromechanical parts. There is a further need for achieving significant reductions in size, mass and manufacturing cycle times of low voltage electrical systems. Most RP systems allow building cycle sequences to be interrupted, thus opening the possibility of encapsulating electromechanical components within the model structure. For example, some have demonstrated the feasibility of encapsulating sensors and actuators in metal and polymer structures using Shape Deposition Manufacturing (SDM). Others have demonstrated systems for automatic dispensing of conductive, thermally curable media, such as DW inks, for maskless patterning of electronics. Limitations in speed and feature size, however, have prevented this technology's acceptance in the microelectronics industry. Recently, however, there have been several breakthroughs in DW ink dispensing for military applications which dispense advanced metallic inks through a hollow tip, precisely controlling the ink's flow and stopping points. Although there have been improvements in writing capabilities, many SL resins are incompatible, for example, with the high temperatures required to anneal, cure, dry and/or solidify DW inks. Thus, any attempts at integrating DW technologies with SL technologies have not been successful.

What is desired is a system and method for automated deposition of fluid media during SL on SL-created surfaces, automated curing of the media and continued building without the need to recalibrate or intermediately wash or cure. What is desired, therefore are improvements in part building technology and, in particular, improvements in the integration of curable media, such as DW inks, with SL technologies without contamination. Specifically, there is a need for low cost, efficient and easy-to-use SL processes that accommodate DW ink dispensing technology to fabricate, for example, complex 3D, multi-layered, high density, integrated and fully functional electromechanical systems. These electromechanical systems are more compact, less expensive and more reliable than their conventional predecessors. Additionally, by removing heavy cables, redundancy can easily be designed into a structure where previously it could not be, thus allowing significant size and weight savings for applications such as those in the aerospace and space industries. What is needed therefore is an integrated system capable of manufacturing fully functional electromechanical systems that are more compact, less expensive and more reliable than their conventional counter parts.

The present invention provides, for example, rapid development of circuitry to manufacture more compact components that provide advantages such as weight savings, selfassembly components, rapid manufacturing, and micro circuitry for aerospace, space, homeland security, national defense and a variety of other applications. The present invention also provides, for example, a system and method of integrating thermally curable media with SL without the need for intermediate washing, curing and/or drying. Thus, the present invention could easily be converted to make complex, 3D embedded circuitry, for example, without the addition of costly equipment.

SUMMARY OF THE INVENTION

The present invention overcomes the aforementioned limitations in an effective and efficient manner, and provides, for example, a system and method of integrating stereolithography (SL) and fluid dispensing technology such as direct-write (DW). In accordance with the present invention, single and multi-material SL-fabricated parts may be embedded with complex, three-dimensional (3D) circuitry deposited by DW technology. The present invention also provides for increased micro-fabrication and micro-stereolithography without the need for part re-registration. Moreover, the present invention may cure the fluid using, for example, the same laser used in the SL machine, an alternative laser, other energy source or other curing means. Once the fluid is cured sufficiently, the part may be re-immersed in the resin without contamination and the SL building process can continue.

The present invention also provides an integrated rapid prototyping apparatus comprising: one or more stereolithography apparatuses having one or more lasers adapted to cure a resin; and one or more fluid dispensing apparatuses configured to communicate with the stereolithography apparatus and adapted to deposit fluid on the resin cured by the stereolithography apparatus.

The present invention further provides a method of integrated rapid prototyping comprising: fabricating a first part layer using stereolithography apparatus; and depositing fluid on the first part layer using a fluid dispensing apparatus with the capability of building complex, 3D circuitry deposited by DW technology by using connector traces.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Figure 1:
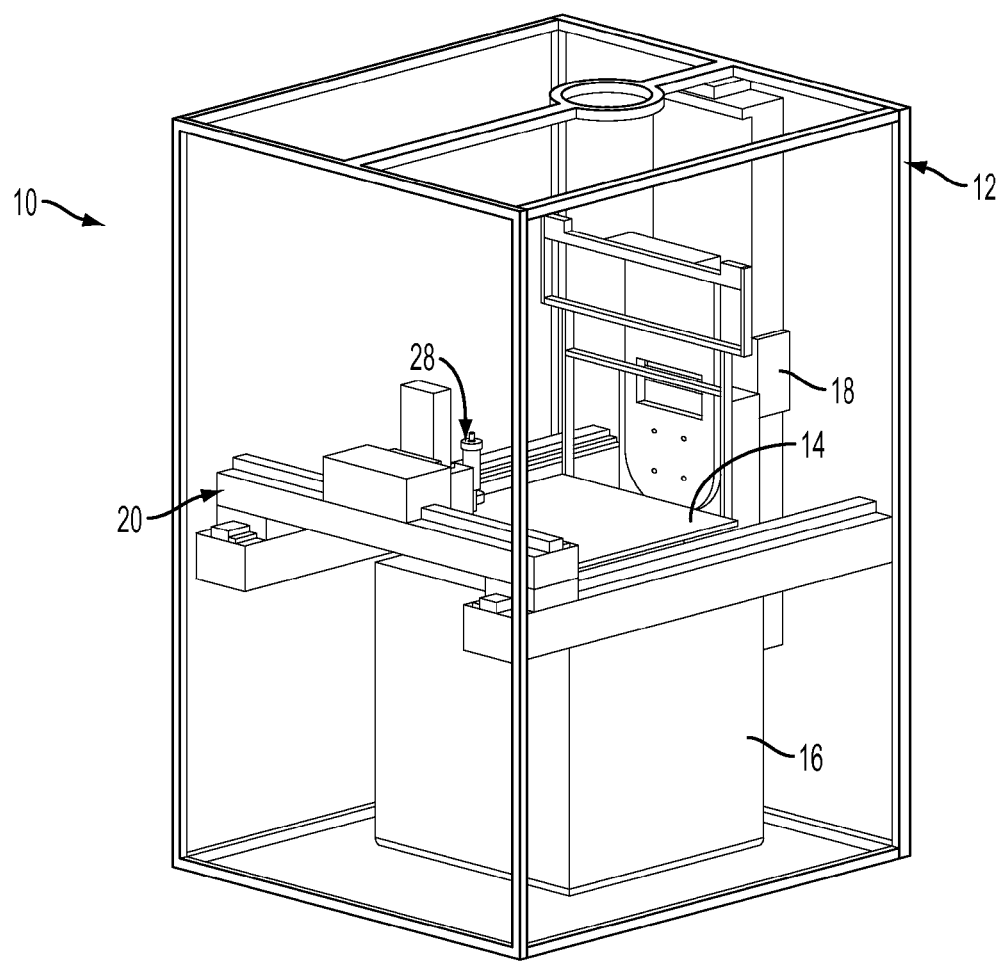
FIG. 1 is a perspective view of a preferred integrated system of the present invention.

Because the stereolithography (SL) and direct-write (DW) technologies are integrated together, the integrated system 10 of the present invention depicted in FIG. 1, can easily be retrofitted into existing SL systems. The integrated system 10 comprises a preferred SL system 12 with a platform 14 and a vat 16 adapted to vertically traverse along a Z-traverse mechanism 18. SL system 12 may include a platform 14 that is optionally adapted to rotate about a horizontal axis for angled part and circuitry building. It should be understood by those skilled in the art that although FIG. 1 depicts a single vat system, a multiple vat system may also be employed. It should further be understood that although FIG. 1 does not depict intermediate washing and/or curing units, a system which accommodates intermediate washing and/or curing may also be employed.

Figure 2A:
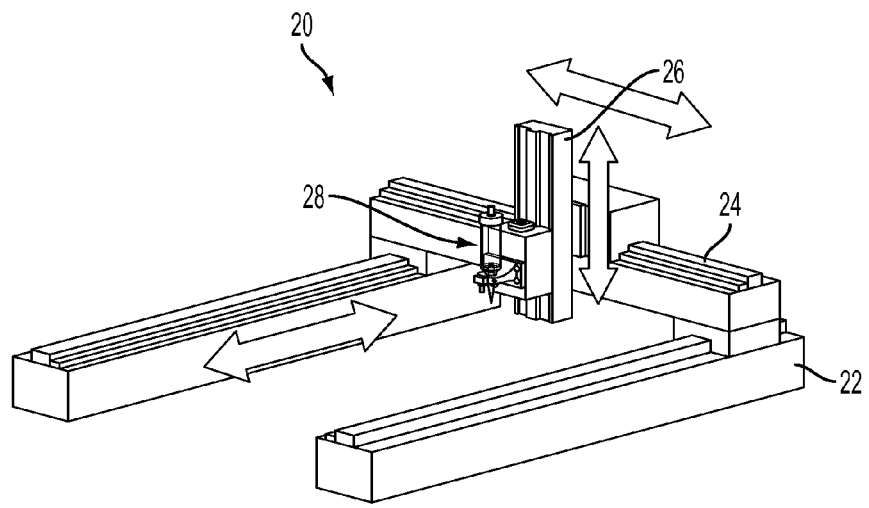
FIG. 2A is a perspective view of a preferred gantry system of the present invention.

Now referring to FIG. 2A, a DW system is preferably configured to the integrated system 10 with, for example, a translation device or gantry 20. The gantry 20 preferably has three directional stages, gantry X stage 22, gantry Y stage 24 and gantry Z stage 26, which provide, for example, fluid placement capability without intermediate calibration and or removal of the subject part. The fluid dispensing system 28 supplies the fluid necessary to facilitate DW. The fluid dispensing system 28 may be adapted to dispense a variety of fluids including, for example, inks, conductive inks, curable inks, curable media, conductive fluids, electronic inks, conductors, insulators, semi-conductive materials, magnetic materials, spin materials, piezoelectric materials, opto-electronic, thermoelectric materials, radio frequency materials, ultraviolet curable resins, controlled reaction materials, precursor fluids, metal-organic liquids, solutions, suspensions, sol-gels, nanoparticles, colloidal fluids, thermoplastics, extrudable materials, thermosets, 2-part epoxy materials and any combination thereof.

Figure 2B:
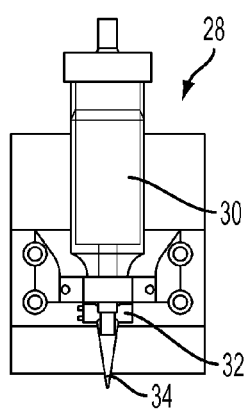
FIG. 2B is a perspective view of a preferred fluid dispensing system of the present invention.
Figure 2C:
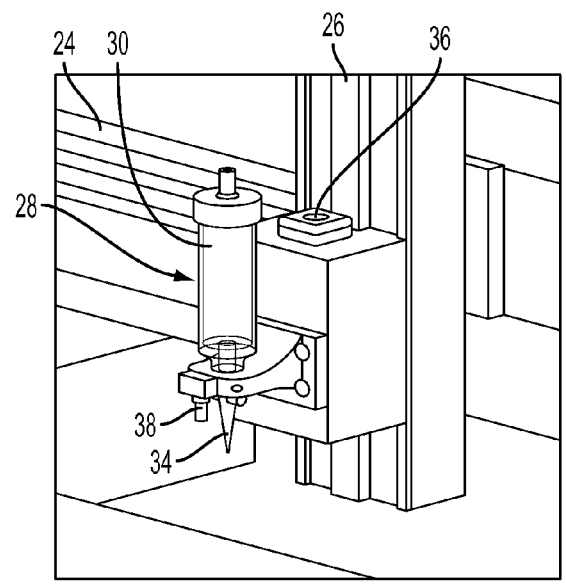
FIG. 2C is a perspective view of a preferred fluid dispensing system configured to the gantry system depicted in FIG. 2A.

As generally depicted in FIG. 2A, the gantry X stage 22 facilitates X-axis movement of the fluid dispensing system 28, while the gantry Y stage 24 and the gantry Z stage 26 facilitates Y-axis and Z-axis movements, respectively. The fluid dispensing and or other substance dispensing system 28 depicted in FIG. 2B preferably includes a pressurized fluid container 30 configured with, for example, a start and stop valve mechanism 32 to control the amount of fluid dispensed from the dispensing nozzle 34 onto the subject part. It should be appreciated that virtually any fluid dispensing system 28, for example, non-contact dispensing mechanisms, non-contact coaxial jet mechanisms, direct-contact dispensing mechanisms, ink jet dispensing mechanisms, pressurized nozzle dispensing mechanisms, liquid droplet generators, continuous ink dispensing mechanisms, filamentary ink dispensing mechanisms, extrusion devices, wire-feed mechanisms, component placement mechanisms, gear pumps, air pressure pumps, positive displacement pumps, screw-driven pumps, syringe pumps, fused deposition modeling nozzles, mixing nozzles, extrusion nozzles and any combination thereof, could be integrated as described herein. As seen in FIG. 2C, the gantry 20, configured with the fluid dispensing system 28, is preferably also configured with a laser pin hole and sensor 36 and a mechanical switch 38. It should be understood that although the present invention primarily describes fluid dispensing mechanisms, the dispensing mechanism may also be adapted for automated placement of other tangible materials such as wires and electrical components.

Figure 3:
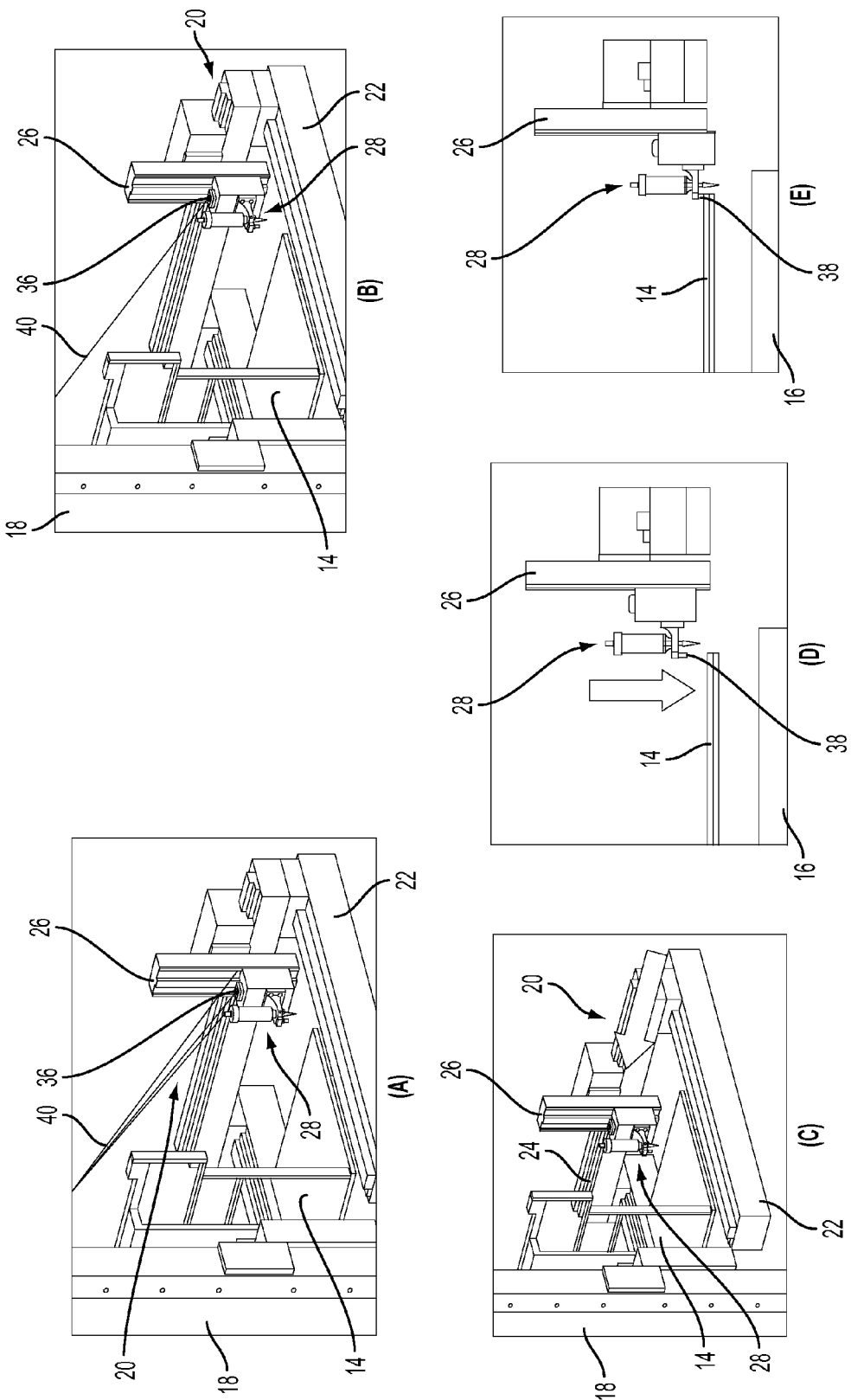
FIG. 3A is an illustration of a preferred X- and Y-axis laser calibration method for the fluid dispensing system and the gantry system depicted in FIG. 1 where the calibration is under process.
FIG. 3B is an illustration of a preferred X- and Y-axis laser calibration method for the fluid dispensing system and the gantry system depicted in FIG. 1 where the calibration is complete for the X- and Y-axis.
FIGS. 3C and 3D are illustrations of a preferred Z-axis laser calibration method for the fluid dispensing system and the gantry system depicted in FIG. 1 where the calibration is under process.
FIG. 3E is an illustration of a preferred Z-axis laser calibration method for the fluid dispensing system and the gantry system depicted in FIG. 1 where the calibration is complete for the Z-axis.

The present invention provides an integrated system 10 which ensures synchronized and accurate part building and circuit layout. In order to calibrate the SL system 12 and fluid dispensing system 28, the integrated system 10 is preferably initialized and calibrated as depicted FIGS. 3A-3E. As seen in FIGS. 3A and 3B, one or more laser pin-hole and sensors 36 aid in X- and Y-axis calibration of the integrated system 10. For example, a laser 40 is directed to the laser pin-hole and sensor 36, as depicted in FIG. 3A. When a maximum power is detected at the laser pin-hole and sensor 36, the laser 40 should be located in the desired calibrated position of integrated system 10, as depicted in FIG. 3B. The mechanical switch 38, on the other hand, aids in Z-axis calibration of gantry 20 and fluid dispensing system 28, as depicted in FIGS. 3C-3E. Z-axis calibration is preferably accomplished, as depicted in FIG. 3E, by positioning the fluid dispensing system 28 and specifically the mechanical switch 38, in an initial position relative to the platform 14. Although the mechanical switch 38 aids in accurately registering the laser 40 with the disposition of the dispensing nozzle 34, it is an optional step. It should be understood by those skilled in the art that there are numerous other methods to accomplish X-, Y- and Z-axis calibration for integrated system 10.

Figure 4:
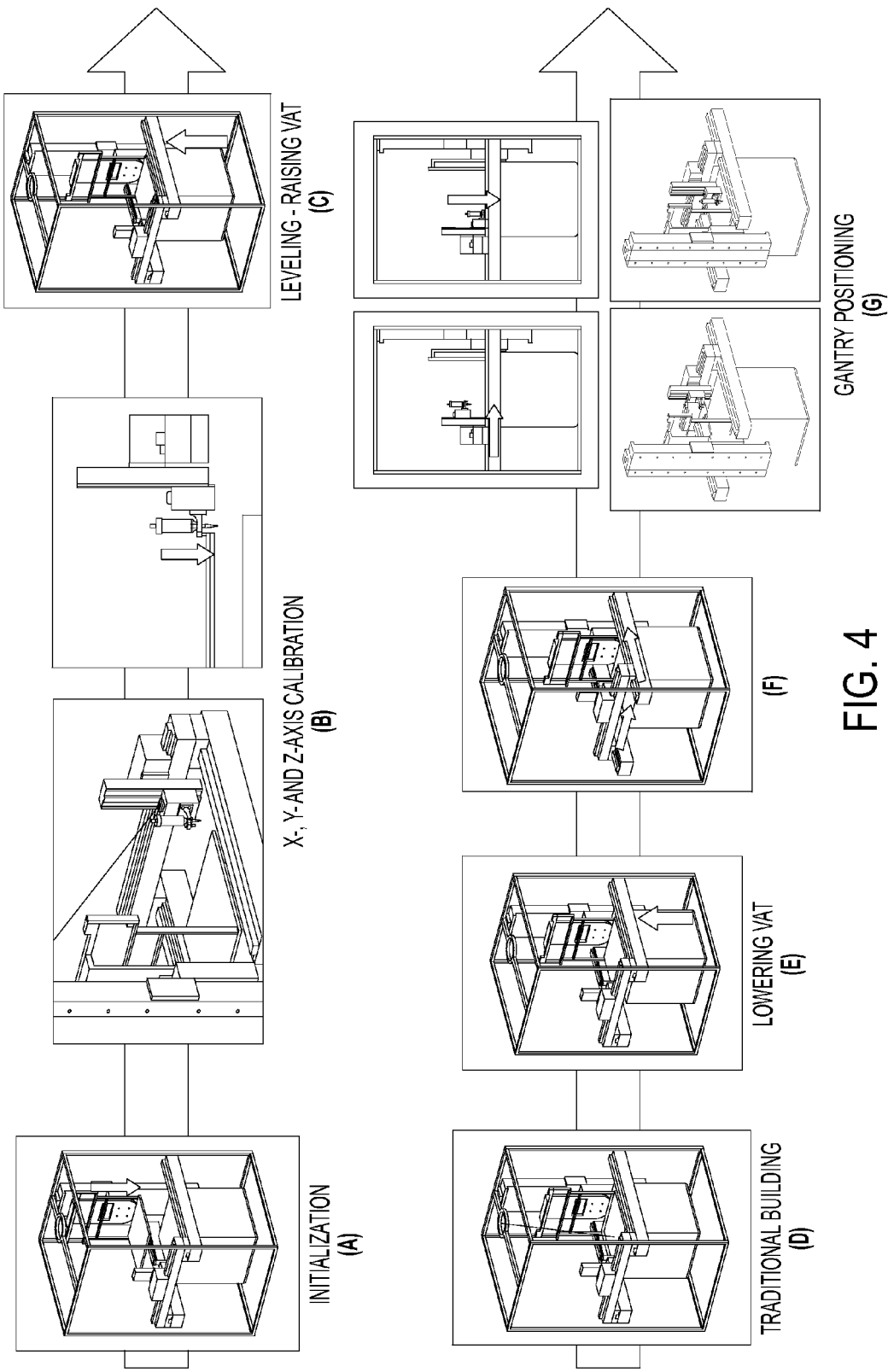
FIGS. 4A-4G depict a preferred process diagram for an integrated system in accordance with the present invention.

FIGS. 4A-4G depict a typical process diagram for integrating SL and DW technologies in accordance with the present invention. For example, the integrated process typically begins with initialization of a typical SL system 12 known in the art and now in accordance with the present invention configured to a gantry 20, as depicted in FIG. 4A. After employing the preferred calibration techniques described above for the X-, Y- and Z-axes and as depicted in FIG. 4B, the building process may begin by leveling the vat 16, as depicted in FIG. 4C. After building a subject part layer, the subject part may be raised slightly out of the resin housed in the vat 16. Traditional SL building may continue, as depicted in FIG. 4D, and the vat 16 is lowered to accommodate building the subject part layer by layer, as depicted in FIG. 4E. The laser 40 optionally cures the surface of the SL resin.

Figure 5:
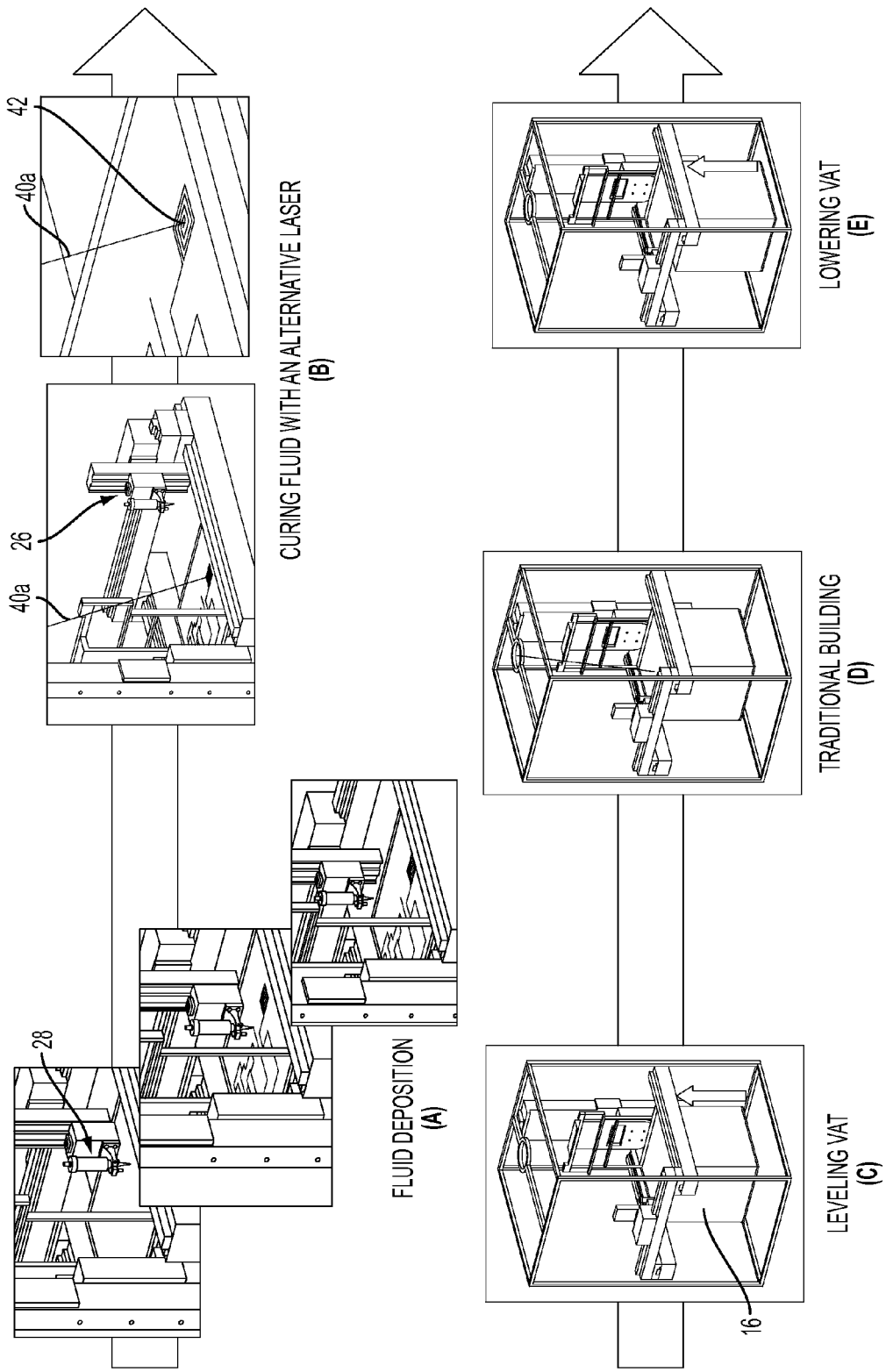
FIGS. 5A-5E depict a preferred process diagram for integrating thermally curable media deposition in accordance with the present invention.

If the subject part requires circuitry, the integrated system 10 accommodates building circuitry without removing the subject part or requiring additional calibration. As depicted in FIG. 4F, the gantry 20 is positioned to create the desired circuit over the subject part. The gantry 20 is positioned by employing any or all of the three directional stages—gantry X stage 22, gantry Y stage 24 and gantry Z stage 26, as depicted in FIGS. 4F and 4G. The fluid dispensing system 28 may then be lowered to a desired position relative to the subject part to begin the fluid deposition process generally depicted in FIGS. 5A and 5B. The fluid dispensing system 28 is adapted build circuitry in any orientation, including for example, in the horizontal, vertical or angled orientation. After fluid deposition is complete, as depicted in FIG. 5A, the integrated system 10 optionally returns the gantry 20 to the initial position and preferably cures the fluid with laser 40 (the same laser used to perform SL) or in some applications with an alternative laser 40a. It should be understood, however, that other curing means may also be employed. After completing the fluid deposition process, the integrated system 10 levels the vat 16 and may begin traditional SL part building on the subject part by optionally submerging the subject part into the resin and preferably swept with a recoating device. The vat is accordingly lowered as each build layer is complete as depicted in FIGS. 5C, 5D and 5E. The integrated system 10 thus provides an efficient system of integrating SL and DW technologies.

Figure 6:
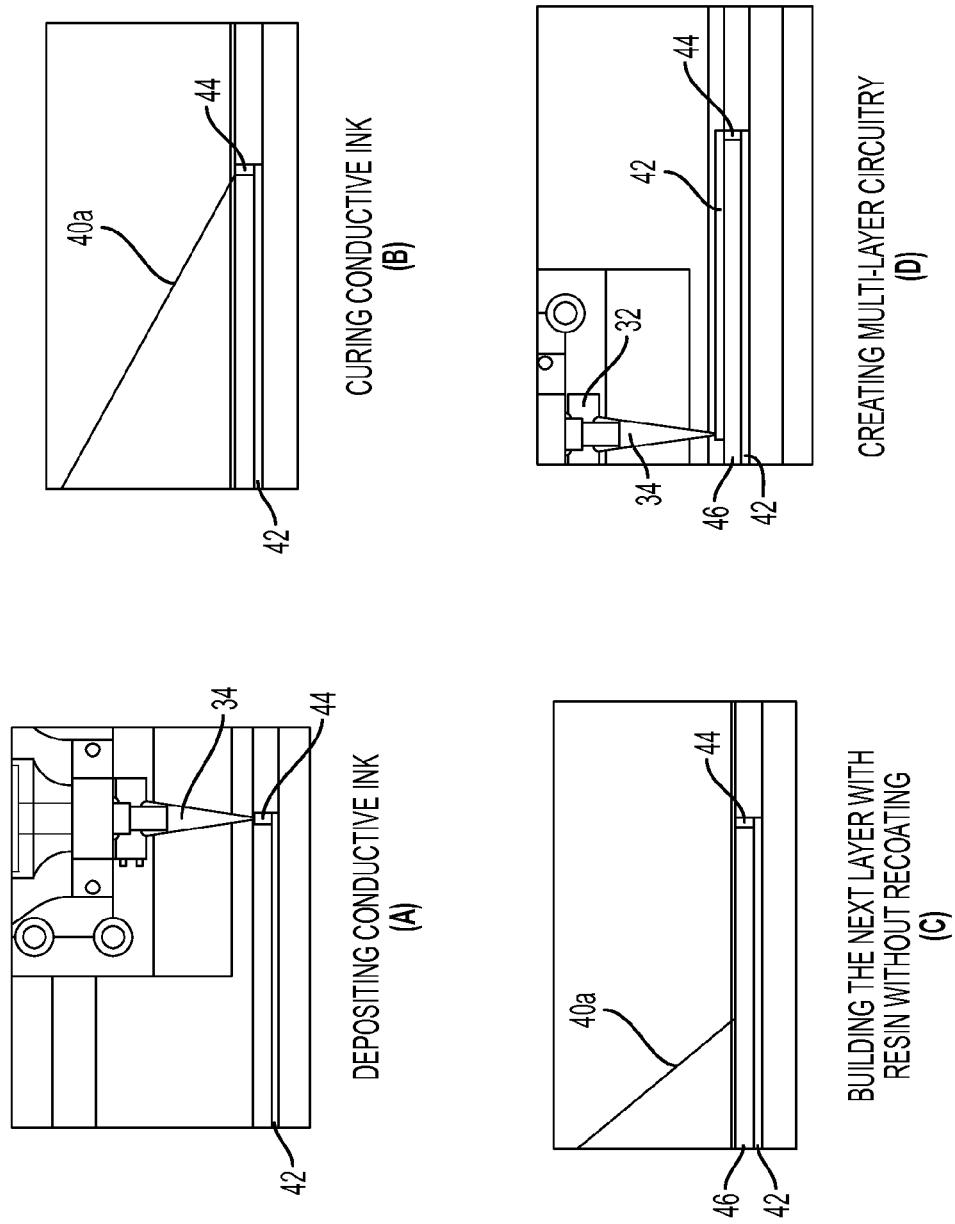
FIGS. 6A-6D depict a preferred process for creating multilayer circuitry in accordance with the present invention.

The integrated system 10 additionally accommodates building, for example, multi-layer circuitry, as generally depicted in FIG. 6. The integrated system 10 may create a multi-layer circuit by dispensing conductive ink 42 in such a manner as to provide continuous conductive path between the subject part's layers. For example, the integrated system 10 makes use of a connector trace 44, which provides continuity of the circuit between the subject part's build layers, as seen in FIG. 6A. After curing the conductive ink 42 with an alternative laser 40a, or other curing means, as depicted in FIGS. 6B and 6C, subject part building continues with or without swiping with, for example, a recoating blade (not depicted). Examples of other curing means may include, for example, ultraviolet light sources, particle bombarders, chemical sprayers, radiation impingers, ink jets, ovens, fans, pumps, curing devices, drying devices that incorporate convection, conduction and/or radiation heat transfer, and any combinations thereof.

To build multilayer circuitry, conductive ink 42 is deposited in a continuous path between a first and second layer of the subject part. Thus, a continuous multi-layer circuit is created between the subject part's layers connected by a connector trace 44. It should be understood that the connector trace 44, need not be positioned in a vertical fashion as depicted for example in FIG. 6D. The connecter trace 44 may be positioned in any fashion wherein the connector trace 44 connects circuitry and provides a continuous electrical connection between different subject part layers.

It should be understood that there are a variety of materials which may be used for resin 46. For example, hydrogels are curable fluid media and may be, for example, a natural polymer, synthetic polymer or some combination thereof. Natural polymer hydrogels include polymers such as anionic polymers (for example, hyaluronic acid, alginic acid, pectin, carrageenan, chondroitin sulfate, dextran sulfate), cationic polymers (for example, chitosan and polylysine), amphipathic polymers (such as collagen, gelatin, carboxymethyl chitin and fibrin) and neutral polymers (for example, dextran, agarose and pullulan) and their derivatives.

Synthetic polymer hydrogels, on the other hand, include, for example, polymers such as polyesters: poly(ethylene glycol)-poly(lactic acid)-poly(ethylene glycol); poly(ethylene glycol)-poly(lactic-co-glycolic acid)-poly(ethylene glycol); poly(ethylene glycol)-polycaprolactone-poly(ethylene glycol); poly(lactic acid)-poly(ethylene glycol)-poly(lactic acid); poly(hydroxyl butyrate); poly(propylene fumerate-co-ethylene glycol)±acrylate end groups; and poly(poly(ethylene glycol)/poly(butylene oxide)terephthalate).

Synthetic polymer hydrogels may include, for example, other polymers such as: poly(ethylene glycol)-bis-(poly(lactic acid)-acrylate); poly(ethylene glycol)±cyclodextrins; poly(ethylene glycol)-g-poly(acrylamide-co-Vamine); polyacrylamide; poly(N-isopropyl acrylamide-co-acrylic acid); poly (N-isopropyl acrylamide-co-ethyl methacrylate); poly(vinyl acetate)/poly(vinyl alcohol); poly(N-vinyl pyrrolidone); poly (methyl methacrylate-co-hydroxyethyl methacrylate); poly (acrylonitrile-co-allyl sulfonate); poly(biscarboxy-phenoxy-phosphazene); and poly(glucosylethyl methacrylate-sulfate).

Combinations of natural and synthetic polymer hydrogels may include polymers such as poly(polyethylene glycol-co-peptides), alginate g-(polyethylene oxide-polypropylene oxide-polyethylene oxide), poly(polylactic-co-glycolic acid-co-serine), collagen-acrylate, alginate-acrylate, poly(hydroxyethly methacrylate-g-peptide), poly(hydroxyethyl methacyrlate/Matrige®) and hyraluronic acid-g-N-isopropyl acrylamide).

Yet other examples of resins 46 include, for example: (1) radically polymerizable organic compounds (such as urethane, (meth)acrylate, oligester(meth)acrylate, epoxy(meth) acrylate, thiol compound, ene compound and photosensitive polyimide); (2) cationically polymerizable organic compounds (such as an epoxy compound, cyclic ether compound, cyclic lactone compound, cyclic acetal compound, clycle thioesther compound, Spiro orthoester compound and vinyl ether compound); (3) radically polymerizable organic compound and a catonically polymerizable organic compound; and (4) radically polymerizable organic compound (an ethylenically unsaturated monomer), a polyether, polyol compound and elastomer particles.

Moreover, also in accordance with the present invention, multi-colored manufacturing is accomplished by mixing pigments, paints, dyes and/or other color media into the conductive ink 42 and/or resin 46, thereby facilitating the manufacture of multi-colored prototypes, models and circuitry. Similarly, other materials may, optionally, be mixed into the conductive inks 42 and/or resin 46 to alter the strength, thermal, mechanical, optical, electrical, functional and/or bio-functional properties thereby facilitating the manufacture of multi-functional, multi-material, multi-colored, multi-element and/or implantable prototypes, models, finished products and circuits. The present invention thus facilitates using SL and DW technology to aid in manufacturing of parts and circuitry in an endless number of materials, colors and designs.

Thus, the present invention thus provides, for example, a system and method of integrating fluid media dispensing technology such as DW technologies with RP technologies such as SL. The present invention is capable of efficiently building single and multi-material SL fabricated parts with complex, three-dimensional embedded circuitry using DW without the need for part re-registration.

Although a preferred system and method for integrating thermally curable media during stereolithography is discussed in detail herein, it will be appreciated that the present invention provides many applicable inventive concepts that can be embodied in a wide variety of specific contexts. For example, while the description has principally referenced curable ink deposition, it is to be understood that the present invention may also be utilized for other curable media deposition such as thermally curable media deposition, curable conductive material deposition, ultraviolet curable resins or controlled reaction materials such as 2-part epoxies. The specific embodiments discussed herein are merely illustrative of specific ways to make and use the invention, and do not delimit the scope of the invention. Those skilled in the art will recognize that various substitutions and modifications may be made to the invention without departing from the scope and spirit of the appended claims.

What is claimed is:

1. A method of integrated rapid prototyping comprising:
    fabricating a first part layer using a layered manufacturing apparatus;
    depositing fluid on the first part layer using a fluid dispensing apparatus without removing the first part layer from the layered manufacturing apparatus;
    fabricating a second part layer on top of the first part layer; and
    depositing fluid on the second part layer such that the fluid on the second part layer is coupled to the fluid on the first part layer by an electrically conductive material.

2. The method of integrated rapid prototyping of claim 1, where depositing fluid includes depositing the fluid to make an electrically conductive trace on the first part layer.

3. The method of integrated rapid prototyping of claim 1, further comprising:
    curing the fluid on the first part layer before fabricating the second part layer.

4. The method of integrated rapid prototyping of claim 3, wherein the step of curing is accomplished by selecting a curing apparatus selected from the group consisting of: a ultraviolet light source, a particle bombarder, a chemical sprayer, a radiation impinger, an inkjet, an oven, a fan, a pump, a curing device and a drying device that incorporates convection, conduction and/or radiation heat transfer and any combinations thereof.

5. The method of integrated rapid prototyping of claim 2, where the electrically conductive trace is part of an electric circuit.

6. The method of integrated rapid prototyping of claim 1, wherein the fluid is selected from the group consisting of: inks, conductive inks, curable inks, curable media, conductive fluids, electronic inks, conductors, insulators, semiconductive materials, magnetic materials, spin materials, piezoelectric materials, optoelectronic, thermoelectric materials, radio frequency materials, ultraviolet curable resins, controlled reaction materials, precursor fluids, metal-organic liquids, solutions, suspensions, sol-gels, nanoparticles, colloidal fluids, thermoplastics, extrudable materials, thermosets, 2-part epoxy materials and any combination thereof.

7. The method of integrated rapid prototyping of claim 1, wherein the step of depositing the fluid is accomplished by a mechanism selected from the group consisting of: non-contact dispensing mechanisms, non-contact coaxial jet mechanisms, direct-contact dispensing mechanisms, ink jet dispensing mechanisms, pressurized nozzle dispensing mechanisms, liquid droplet generators, continuous ink dispensing mechanisms, filamentary ink dispensing mechanisms, extrusion devices, wire-feed mechanisms, component placement mechanisms, gear pumps, air pressure pumps, positive displacement pumps, screw-driven pumps, syringe pumps, fused deposition modeling nozzles, mixing nozzles, extrusion nozzles and any combination thereof.

8. The method of integrated rapid prototyping of claim 1, wherein the fluid dispensing apparatus is a direct write apparatus.

9. The method of integrated rapid prototyping of claim 1, further comprising:
    calibrating the fluid dispensing apparatus with the layered manufacturing apparatus.

10. The method of integrated rapid prototyping of claim 1, wherein the layered manufacturing apparatus is adapted to build multi-material parts.

11. The method of integrated rapid prototyping of claim 6, where the fluid is a curable media comprising a hydrogel polymer.

12. The method of claim 1, where the second part layer contacts the first part layer.

13. A method of integrated rapid prototyping comprising:
fabricating a first part layer using a layered manufacturing apparatus;
depositing fluid on the first part layer using a fluid dispensing apparatus without removing the first part layer from the layered manufacturing apparatus;
fabricating a second part layer on top of the first part layer;
depositing fluid on the second part layer; and
depositing fluid to connect the fluid disposed on the first part layer and the fluid disposed on the second part layer.

* * * * *

UNITED STATES PATENT AND TRADEMARK OFFICE
CERTIFICATE OF CORRECTION

PATENT NO. : 8,252,223 B2
APPLICATION NO. : 12/646632
DATED : August 28, 2012
INVENTOR(S) : Francisco Medina et al.

Page 1 of 1

It is certified that error appears in the above-identified patent and that said Letters Patent is hereby corrected as shown below:

On the title page, item (57) Abstract, line 7, delete "Z-," and insert -- X-, -- therefor.

Signed and Sealed this
Eleventh Day of March, 2014

Michelle K. Lee
*Deputy Director of the United States Patent and Trademark Office*